United States Patent [19]

Johnson et al.

[11] 4,132,394
[45] Jan. 2, 1979

[54] FURNACES

[75] Inventors: Keith Johnson; Frank Hipkin, both of West Midlands, England

[73] Assignee: Ace Furnaces Limited, Cheshire, England

[21] Appl. No.: 805,237

[22] Filed: Jun. 9, 1977

[30] Foreign Application Priority Data

Jun. 9, 1976 [GB] United Kingdom ............... 23876/76
Jun. 9, 1976 [GB] United Kingdom ............... 23877/76

[51] Int. Cl.² .................... F27B 14/00; F27B 14/14
[52] U.S. Cl. .................................. 266/138; 266/900; 266/901; 432/156
[58] Field of Search ............... 266/138, 200, 254, 900, 266/901; 432/141, 142, 156, 157, 158, 179, 180, 223, 262, 263, 264, 265

[56] References Cited

U.S. PATENT DOCUMENTS

| 1,996,660 | 4/1935 | Stanworth et al. | 432/156 |
| 2,253,707 | 8/1941 | Hoke | 432/156 |
| 3,860,223 | 1/1975 | Berger | 266/900 X |

FOREIGN PATENT DOCUMENTS

| 2063279 | 9/1971 | France | 266/901 |
| 572380 | 10/1945 | United Kingdom | 432/156 |

Primary Examiner—Roy Lake
Assistant Examiner—Paul A. Bell
Attorney, Agent, or Firm—Scrivener, Parker, Scrivener & Clarke

[57] ABSTRACT

A fuel-fired furnace for melting metal in a more efficient manner, the furnace having a burner with its combustion air being preheated by passage through an air chamber between spaced inner and outer walls of the furnace jacket and by passage through a heat exchanger through which waste combustion products pass. The jacket is double insulated and the burner is cooled by a special arrangement.

6 Claims, 4 Drawing Figures

FURNACES

BACKGROUND OF THE INVENTION

This invention relates to furnaces. This invention is concerned with furnaces commonly called bale-out in which the metal is melted in a crucible and then removed by a ladle dipped into the melt. However, this invention could be applied to other types of furnaces which have removable crucibles, or which are tilted to pour the molten metal into a ladle or the like. Additionally, this invention is concerned with furnaces which are fuel-fired, that is not electric furnaces.

Previously, the combustion air for a furnace burner has either been delivered directly to the burner at ambient temperatures or has been pre-heated by heat exchange with the products of combustion. In the case where pre-heating has occurred this usually involves passing the combustion air through a jacket surrounding the refractory lining of the furnace. The lining is quite heat conductive and therefore a large proportion of the heat used for preheating the combustion air is heat that could have been used for heating the metal. Accordingly, although the efficiency of the furnace is increased on the one hand by pre-heating the combustion air, the efficiency is simultaneously decreased by the utilisation of useful heat to pre-heat the air.

It is an object of the present invention to improve the efficiency of the furnaces as aforementioned by providing an improved furnace construction in which combustion air for a furnace burner is headed in two stages by waste heat only.

SUMMARY OF THE INVENTION

According to the present invention we provide a fuel-fired furnace comprising a jacket having a refractory lining and a layer of insulative material between the lining and the jacket, the jacket defining a combustion chamber adapted to receive a charge of metal t be melted by the products of combustion from a burner, at least a portion of the jacket comprising spaced inner and outer walls defining an air chamber, and heat exchange means connected to an outlet from the combustion chamber for the passage of the exhaust products of combustion, the arrangement being such that combustion air for the burner flows through the air chamber and through the heat exchange means prior to its delivery to the burner.

The combustion air is thus pre-heated within the air chamber by heat escaping through the layer of insulative material and within the heat exchange means by heat exchange with the hot exhaust products of combustion. The preheating of the combustion air thereby maintains cool the outer surfaces of the furnace and reduces the temperature of the exhaust products of combustion which greatly improves the working conditions for the furnace operators and the local environment.

Preferably, the jacket is of double-walled construction and includes an inlet and an outlet for combustion air and means for directing the combustion air along a predetermined path through the air-chamber. Conveniently the inlet and the outlet for the combustion air each comprise a slot formed in the outer wall of the jacket and the means for directing the combustion air comprises a septum connecting the inner and outer walls between the slots.

Preferably the heat exchange means comprises an outer casing having an inlet connected to the outlet from the air chamber and an outlet connected to the combustion chamber for delivering combustion air to the burner and, an inner exhaust pipe connected to the combustion chamber through which the hot products of combustion are conducted. A sleeve is provided around the exhaust pipe and has an inlet open to the interior of the casing and an outlet connected to the combustion chamber so that combustion air entering the casing flows through the sleeve to the combustion chamber.

Conveniently a blower is used to blow the combustion air into the air chamber so that it passes through the air chamber and through the heat exchanger to the burner. The blower preferably comprises a fan mounted in a fan casing on the outer wall of the jacket.

Preferably the refractory lining comprises pre-cast blocks made from refractory material and the insulative material comprises lightweight fibrous and/or particulate insulation.

The burner preferably comprises inner and outer metal tubes. One end of the inner tube mounting a burner nozzle and the other end is connected to the fuel supply of for example, oil or gas. The space between the inner and outer tubes is supplied with cooling fluid, for example air, which flows over the burner nozzle and is combusted by the burner flame. The cooling fluid cools the burner nozzle and the fuel flowing through the inner tube. Conveniently the cooling air is supplied from the same fan as the combustion air for the burner. The cooling of the burner nozzle enables the burner to be mounted in a position inwardly disposed relative to the side walls of the furnace so that the flames can be used more efficiently to heat the crucible. Preferably the burner is mounted so that the flames and products of combustion do not impinge directly on the crucible but are offset to one side so as to induce a flow of the products of combustion around the crucible.

BRIEF DESCRIPTION OF THE DRAWINGS

A preferred embodiment of the invention will now be described in more detail with reference to the accompanying drawings in which.

DESCRIPTION OF THE PREFERRED EMBODIMENTS

Figure 1:
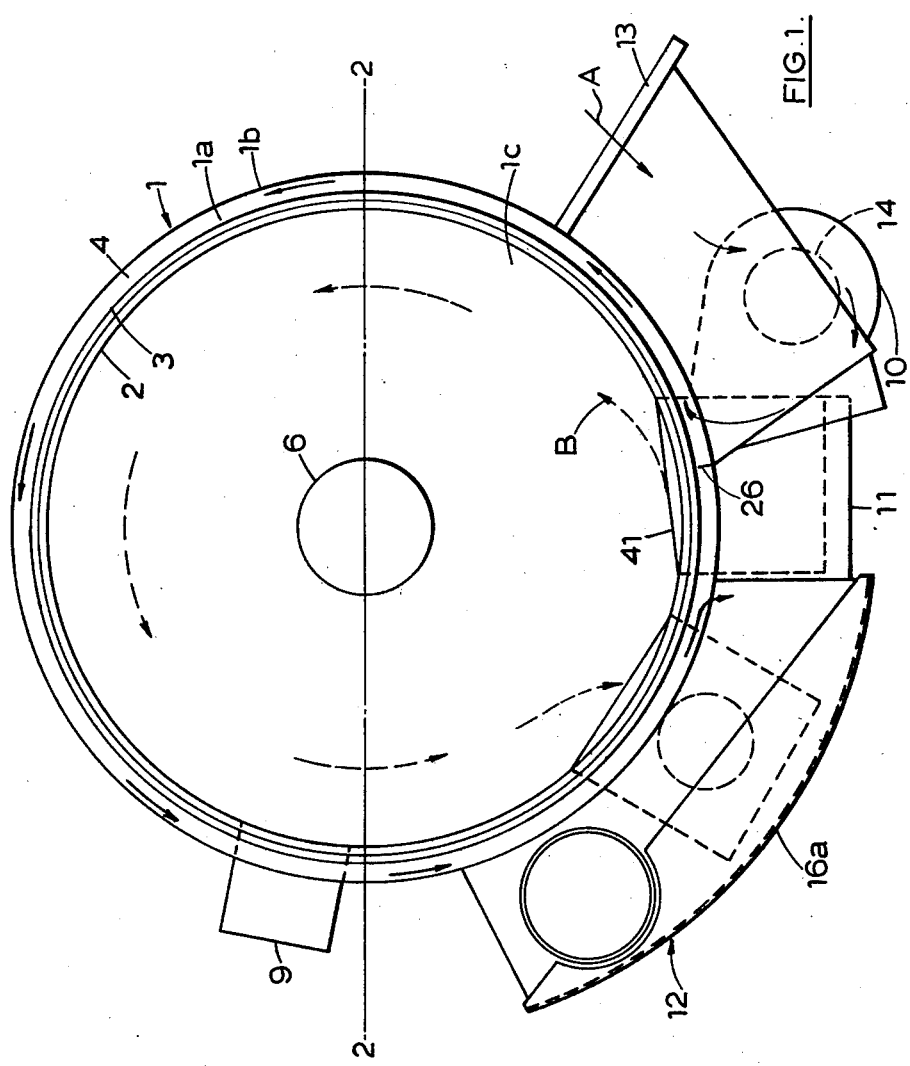
FIG. 1 is a plane view of a bale-out furnace with the cover removed.

The furnace is of generally upright cylindrical shape and comprises a double walled metal jacket 1 provided with a refractory lining 2 and a layer of insulative material 3 interposed between the jacket 1 and the lining 2. The inner and outer walls 1a, 1b respectively of the jacket define an air chamber 4 through which combustion air is passed in a preheating stage as will be described later.

Figure 2:
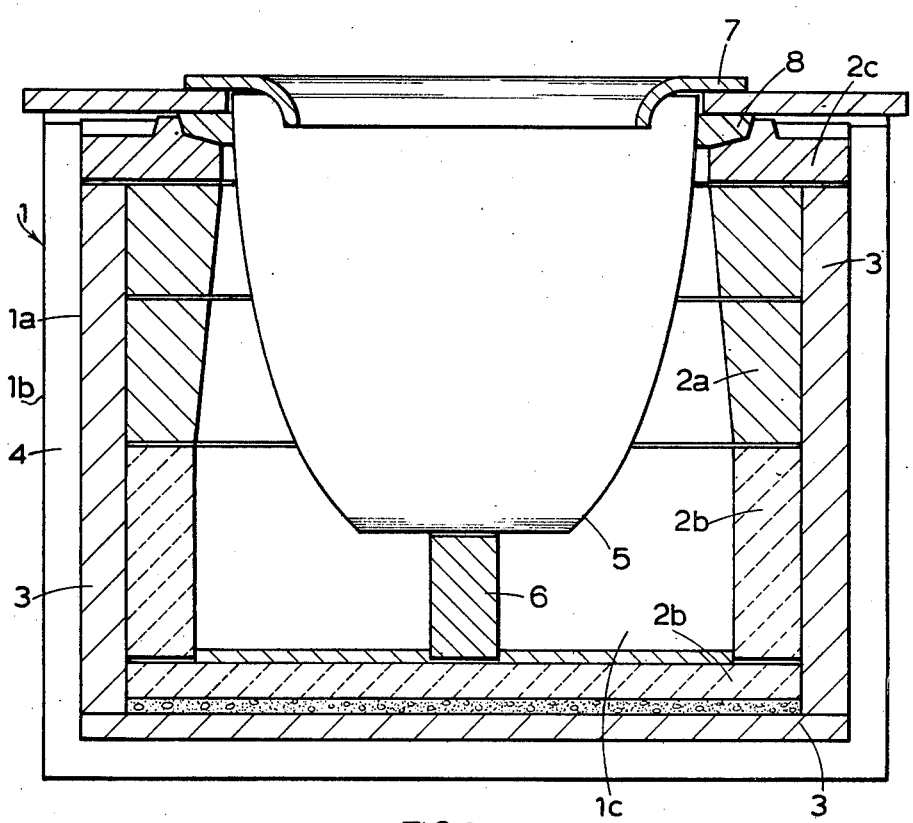
FIG. 2 is a detailed section on the line 2—2 of FIG. 1 showing the construction of the furnace lining.

As shown in FIG. 2, the lining 2 preferably comprises pre-cast blocks made from insulation brick 2a and firebrick 2b (>56% alumina), 2c (40% alumina) while the insulative material comprises lightweight fibrous and/or particulate insulation, for example ceramic fibre either as compressed bulk-fibre or blanket. A crucible 5 mounted on a furnace stand 6 is arranged within the furnace combustion chamber 1c and is centrally located therein by a locating ring 7 which closes the open end of the combustion chamber. The crucible is rotatable about a vertical axis on the furnace stand and the upper end of the crucible is sealed relative to the lining 2 by a flexible seal 8 comprising an annular ring of ceramic fibre. A lid (not shown) is provided to close the open end of the crucible. The lid is removable to allow charging of the crucible and removal of molten metal. A metal run-out port 9 is provided at the junction of the side and base walls ofthe lining so that in the event of the crucible fracturing the molten metal runs out to a suitable collection point. The base wall may be of any convenient construction so that molten metal runs towards the port 9, for example the base wall may be inclined with a generally horizontal step for the furnace stand 6.

Mounted on the outer wall of the jacket 1 are a fan casing 10, a burner casing 11 and a heat exchanger 12. The fan casing has a louvred air inlet 13 and mounts a main fan 14 for supplying combustion air to the chamber 4 through a slot (not shown) in the outer wall of the jacket and there may be an auxiliary fan (not shown). The burner casing houses an oil-fired burner 15. A gas-fired burner could be used in place in the oil-fired burner 15.

Figure 3:
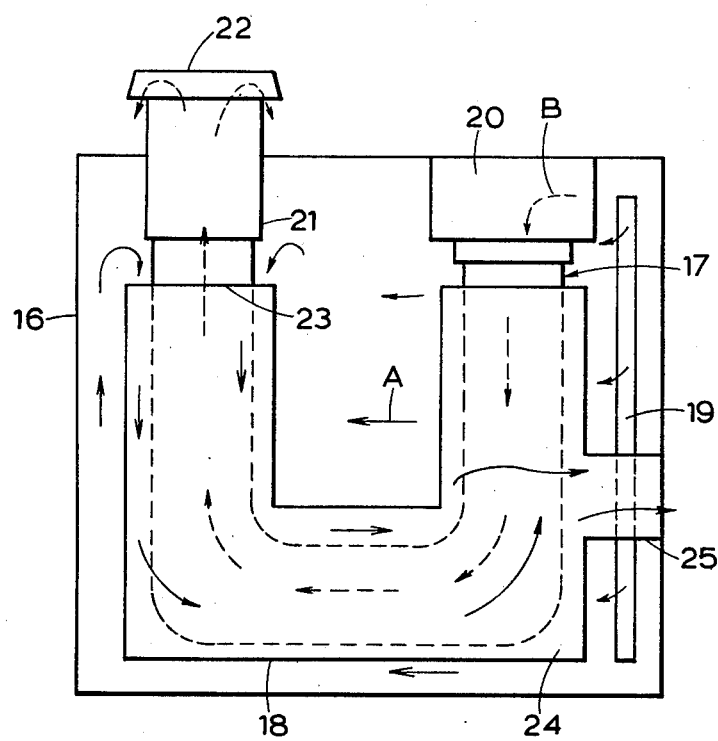
FIG. 3 is a side view of the heat exchanger shown in FIG. 1 with the cover plate removed.

As best shown in FIG. 3, the heat exchanger comprises an outer casing 16, a U-shaped exhaust pipe 17 and a U-shaped sleeve 18 surrounding the pipe 17 and spaced therefrom. The casing 16 has a cover plate 16a (see FIG. 1) which is detachable to facilitate assembly and maintenance of the heat exchanger. The casing 16 is connected to the chamber 4 by a slot 19 formed in the outer wall of the jacket 1. One end of the exhaust pipe 17 is connected to an outlet 20 for exhaust combustion gases from the combustion chamber and the other end is connected to an inlet 21 to a flue stack 22. One end of the sleeve 18 is closed, the other end is open forming an inlet 23 to the space 24 between the exhaust pipe 17 and the sleeve 18. An outlet 25 from the sleeve 18 is connected to an inlet (not shown) for the supply of preheated combustion air to the burner 15 as described later. As shown in FIG. 1 a septum 26 connects the inner and outer walls of the jacket between the slot 19, the slot through which the combustion air is introduced into the air chamber 4.

Figure 4:
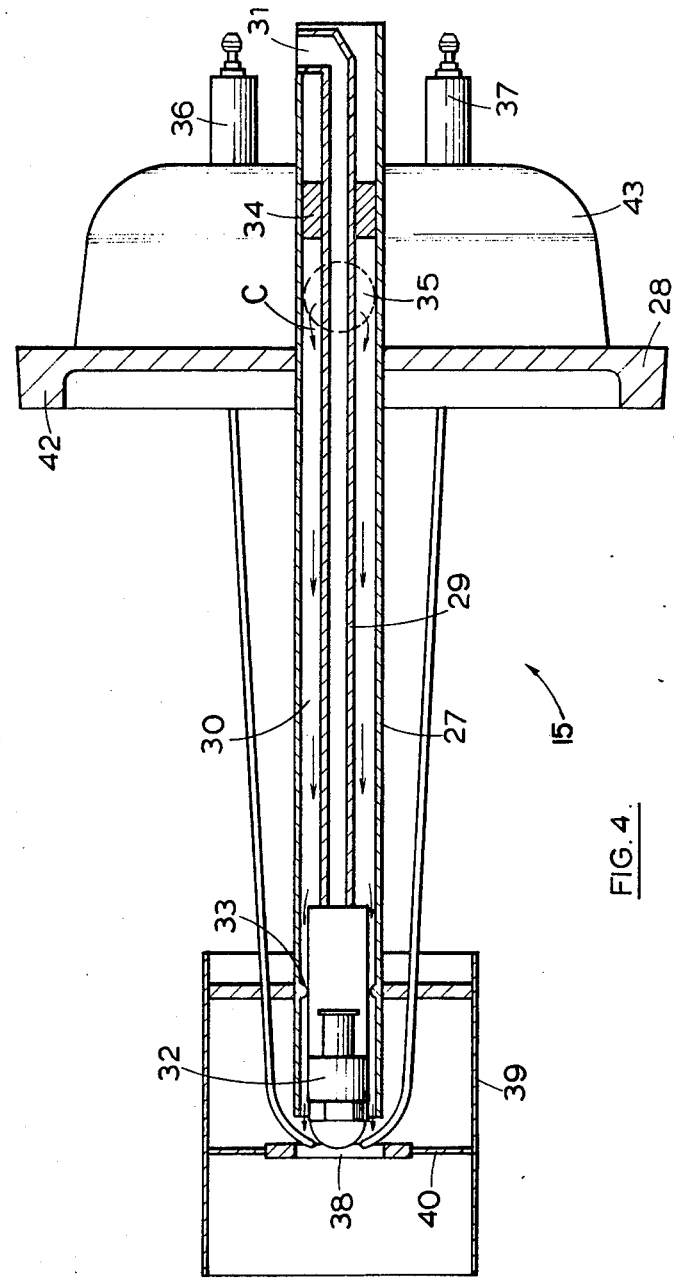
FIG. 4 is a side view, partly in section of the burner.

Referring now to FIG. 4, the burner 15 comprises an outer tube 27, mounted on an annular metal mounting plate 28, and an inner tube 29 with a space 30 therebetween. One end 31 of the inner tube is connected to a flexible oil inlet pipe (not shown) and the other end mounts a burner nozzle 32 arranged within the outer tube 27. The inner tube and burner nozzle are centrally located within the outer tube by ribs 33 engaging the burner nozzle 32 and a spigot 34 provided at the head of the inner tube. An air inlet 35 formed in the outer tube on the burner nozzle side of the spigot 34 is connected to a flexible air bleed pipe (not shown) from the main fan for the supply of cooling air to the burner. A pair of ignition electrodes 36, 37 are mounted on the mounting plate and define a spark gap 38 adjacent to the burner nozzle outlet for igniting the flame in known manner. The burner nozzle end of the burner is enclosed in an open cylindrical casing 39 having a flame plate 40. The burner is located in an opening 41 (see FIG. 1) in the furnace wall and an annular flange 42 locates the mounting plate on the burner casing 11 thereby ensuring the burner nozzle is correctly positioned in the furnace. The mounting of the burner 15 on the mounting plate is such that when the burner is in position it does not project radially inwards towards the crucible but is angularly offset so that the flame and products of combustion do not impinge directly on the crucible but are directed to one side of the crucible to induce a swirling motion of the products of combustion around the crucible. The burner nozzle 32 is arranged adjacent to the lower end of the crucible while the outlet 20 to the heat exchanger is arranged adjacent to the upper end of the crucible. The products of combustion therefore not only follow a circular flowpath around the crucible but also flow upwards in the combustion chamber to the outlet so that the crucible is heated over its entire surface. However the lower end of the crucible is heated by the initially hot products of combustion while the upper end is heated by the relatively cooler products of combustion passing upwards so that a temperature gradient may occur between the lower and upper ends of the crucible resulting in uneven heating of the metal and consequent inefficient operation of the furnace. To reduce any such temperature gradient the side walls of the refractory lining are constructed so that they converge inwardly towards the upper end of the crucible as shown in FIG. 2. The reduced space between the crucible and the side walls of the lining increases the velocity of the products of combustion at the upper end of the crucible and in this way a more even heating of the crucible is obtained. Other configurations of the lining and of the crucible are possible, the only requirement being that the internal surface of the lining and the crucible are relatively convergent upwardly from the base wall when the outlet 20 is at the upper end of the furnace. Of course if the position of the burner 15 and outlet 20 were reversed the internal surface of the lining and the crucible would be relatively convergent downwardly from the upper end of the crucible.

Operation of the furnace will now be described in more detail with reference to FIGS. 1, 3 and 4 in which the flow-path of the combustion air is shown by the arrows A, the flow-path of the products of combustion is shown by the arrows B, and the flow-path of the cooling air for the burner nozzle is shown by the arrows C. Starting from cold, combustion air entering the fan causing 10 through the louvred inlet 13 is directed by the main fan 14 through the slot in the outer wall of the jacket 1. Septum 26 ensures that the air then flows around the chamber in the direction of the arrows A until it reaches the slot 19 in the outer wall of the jacket where it passes into the heat exchanger 12. Once in the heat exchanger the combustion air flows across the heat exchanger as shown and enters the space 24 between the sleeve 18 and the exhaust pipe 17 through the inlet 23. The combustion air flows through the space 24 to the outlet 25 from the sleeve and is delivered to the burner where it is mixed with the oil and cooling air leaving the burner nozzle 32. The extent of the flame of the burner and the products of combustion are directed to one side of the crucible and flow around the crucible in the direction of the arrows B before entering the outlet 20 from the combustion chamber to the exhaust pipe 17. The products of combustion flow through the exhaust pipe and are discharged from the flue stack 22. Once the burner flame has been ignited the burner combustion air is pre-heated in two stages. In the first stage, by heat escaping through the insulative layer while the combustion air is flowing through the chamber 4, and in the second stage, by heat exchange with the exhaust gases in the heat exchanger 12. Both stages of the pre-heat of the combustion air utilize waste heat only i.e. heat that would otherwise have been lost by conduction through the insulative layer and with the exhaust gases leaving the flue stack 22. No use is made of heat which could otherwise be usefully employed in heating the crucible. The cooling air supplied to the burner 15 is conducted through the space 30 in the direction of the arrows C and exits as a jet from the burner nozzle 32 where it is combusted in the flame.

The cooling air reduces the temperature of the nozzle 32 and the inner pipe 29. Means (not shown) for example spiral baffles may be provided to make the cooling air follow a spiral pathway around the inner pipe 29 to improve the cooling effect. In addition the mounting plate 28 acts as a heat sink to further cool nozzle 32 and the inner pipe 29 by conduction of heat away from the burner nozzle 32. The mounting plate 28 is also provided with cooling fins 43 to increase the radiation of the heat. Conveniently, if an auxiliary fan is employed it is arranged to direct a blast of cool air over the fins 43 to improve the cooling effect and to keep cool the burner casing 9 and other equipment mounted in cloxe proximity to the fan casing.

Using the above described arrangement in a furnace of 200, 300 or 400 lbs. capacity it has been possible to pre-heat the combustion air to 400° C. It has been found that compared to known furnaces of similar capacity in which there is no pre-heating of the combustion air or in which the pre-heating involves utilisation of heat which could otherwise be used for heating the metal the melting times for a charge of metal, for example aluminium at 720° C., both for melting in a cold furnace and in a hot furnace are considerably reduced while the thermal efficiency of the furnace is increased leading to savings of approximately 50% in the amount of energy required for metal melting.

In one modification to the above described furnace a part of the refractory lining below the outlet to the heat exchanger is made to project inwards towards the crucible. In this way most of the products of combustion circulating around the crucible will complete a first rapid circuit without entering the outlet to the heat exchanger i.e. it will pass below the inward projection of the refractory lining and then complete at least a second circuit before entering the outlet to the heat exchanger. In this way more efficient use is made of the products of combustion for heating the crucible thereby further increasing the thermal efficiency of the furnace. Furthermore, the inward projection of the refractory lining effectively prevents the possibility of any short circuit occurring between the burner nozzle and the outlet to the heat exchanger resulting in products of combustion being discharged directly into the outlet without first circulating around the crucible.

In another modification the heat exchanger is replaced by a modified heat exchanger. The outer casing has the inlet at one end for the passage of combustion air from the air chamber and the outlet at the other end for the supply of pre-heated combustion air to the burner. An exhaust pipe or box is arranged intermediate either end of the outer casing and the side walls are formed with a number of corrugations which, together with the walls of the outer casing define a number of passageways through which the combustion air can flow. The exhaust pipe is connected to the outlet for the products of combustion from the combustion chamber and to the flue stack. A series of baffles within the exhaust pipe cause the products of combustion flowing through the exhaust pipe to follow a predetermined path in which they continually pass over the passageway through which the combustion air is passing. The modified heat exchanger provides a more efficient transfer of heat from the products of combustion to the combustion air thereby raising the final temperature of the combustion air which in turn increases the thermal efficiency of the furnace and reduces the amount of fuel required.

Other modifications will be apparent to those skilled in the art. For example the air chamber 4 and heat exchange means consistitute pre-heat means for the combustion air and the combustion air could be passed first through the heat exchanger and then through the air chamber surrounding the furnace. Also the heat exchange means may include bleed means allowing a proportion of the exhaust products of combustion to be mixed with the combustion air and supplied to the burner. Thus in both the above described heat exchange means one or more bleed openings may be provided in the exhaust pipe or box. Such an arrangement further increases the efficiency of the furnace since not only are the exhaust products of combustion at a high temperature thereby further increasing the temperature of the combustion air but they also include excess high temperature oxygen which improves the fuel combustion at the burner. The lid may be provided with lagging to reduce heat loss. Other constructions of heat exchanger may be used for example, the combustion air may be passed through the network of pipes arranged within a casing through which the exhaust products of combustion pass. The advantage of the described heat exchangers is their simple construction comprising a few parts which require only welding to assemble. The heat exchangers are therefore relatively cheap to produce.

As well as the obvious advantage of increased thermal efficiency resulting in a reduction in the amount of fuel required and consequent considerable saving in cost at todays high fuel prices the above described furnace has a number of other advantages particularly from the aspects of safety and improved working conditions.

Firstly the passage of the combustion air through the double walled jacket ensures that the temperature of the outer wall is quite low, reducing the danger of an operator being burned by inadvertently touching the outer wall and also improves the ambient working conditions. The furnace is lower in height than similar known furnaces making the transfer of molten metal from the crucible easier and therefore safer. Similarly, charging the crucible is easier. Clean gases, with no flames visible, at a relatively low temperature leave the flue stack again improving the ambient working conditions. The burner and fans are mounted in casings which reduce the noise and provide an extremely quiet furnace installation. Also since the crucible can be rotated to present a new surface to the burner flame the wear effect of the flame on the crucible can be spread over a larger surface area of the crucible than in similar known furnaces in which the crucible is fixed in position, for example by cement, so that the life of the crucible is considerably increased.

Finally it will be appreciated that the invention is not limited to furnaces in which the crucible is rotatable but can be applied to furnaces in which the crucible can be fixed or can be removed and to furnaces which are pivotally mounted for removal of the molten metal.

We claim:

1. A fuel fired furnace comprising a jacket having an inner refractory lining and a layer insulative material between said lining and said jacket, said lining defining a combustion chamber, a burner firing in said combustion chamber, heat exchange means in communication with said combustion chamber through an outlet for waste products of combustion, inner and outer relatively spaced wall portions of said jacket defining an air chamber disposed externally of said lining and said insulative material and in communicaton with said heat exchange means, said heat exchange means and said air chamber constituting pre-heat means in communication with said burner to deliver pre-heated combustion air to said burner.

2. A fuel-fired furnace according to claim 1 wherein said outer wall of said jacket is formed with an inlet for combustion air and an outlet in communication with said heat exchange means, and said heat exchange means is formed with an outlet in communication with said burner to deliver preheated combustion air to said burner.

3. A fuel-fired furnace according to claim 2 wherein said heat exchange means comprises an outer casing in communication with said air chamber through said outlet formed in said outer wall of said jacket, an inner exhaust pipe connected between said outlet from the combustion chamber and a flue stack, and a sleeve extending around said exhaust pipe and spaced therefrom, and said space is in communication with the interior of the outer casing and with said outlet formed in said heat exchange means.

4. A fuel-fired furnace according to claim 2 wherein said heat exchange means comprises an outer casing in communication with said air chamber through said outlet formed in said outer wall of said jacket and an inner exhaust pipe connected between said outlet from the combustion chamber and a flue stack, said exhaust pipe is formed with a number of corrugations which together with said outer casing define a plurality of passageways extending between said outlet formed in said outer wall of said jacket and said outlet formed in said heat exchange means.

5. A fuel-fired furnace according to claim 1 wherein said burner comprises an inner tube mounting a burner nozzle and through which fuel for the burner is supplied, and an outer tube extending around said inner tube and spaced therefrom, a supply of cooling fluid being conducted through said space therebetween to be directed over said burner nozzle.

6. A fuel fired furnace according to claim 5 wherein said furnace has a base and a furnace stand mounting a crucible, said burner is mounted adjacent to the base of said crucible and said burner nozzle is disposed inwardly of the furnace walls and the extent of the flame of said burner is directed to one side of said crucible, said outlet from the combustion chamber is spaced from and above said burner, the internal surface of the walls of said furnace and said crucible are relatively convergent upwardly from said furnace base and a portion of said furnace wall between said burner and said outlet projects inwards towards said crucible whereby the products of combustion are constrained so as to complete at least two circuis around said crucible prior to entering said outlet.

* * * * *